Dec. 24, 1963   W. T. DONNELLY   3,114,932
PLASTIC OBJECT BLOW MOLDING METHOD AND APPARATUS
Filed Feb. 20, 1962   3 Sheets-Sheet 1
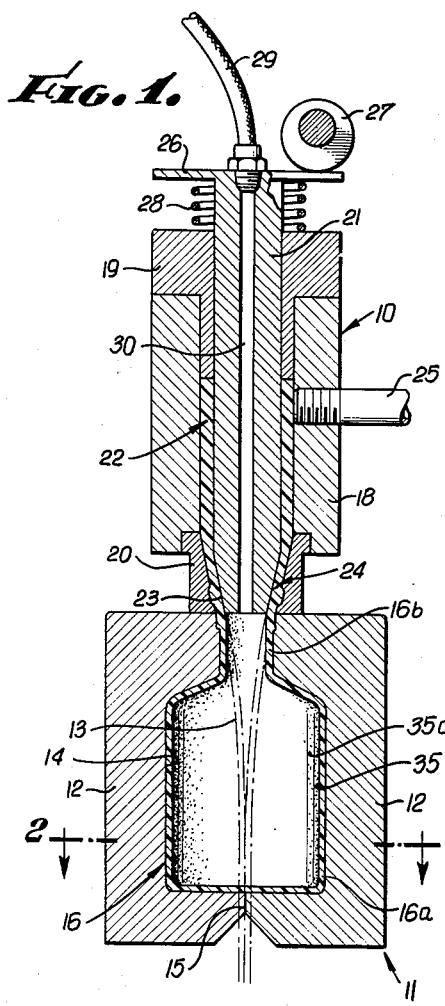
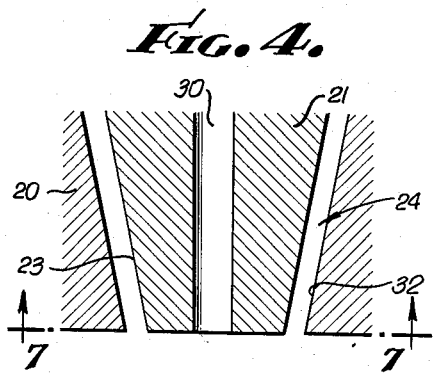
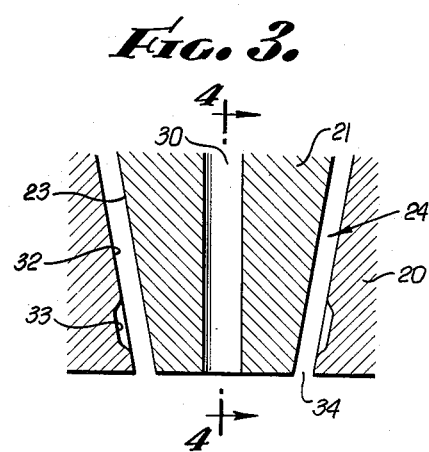
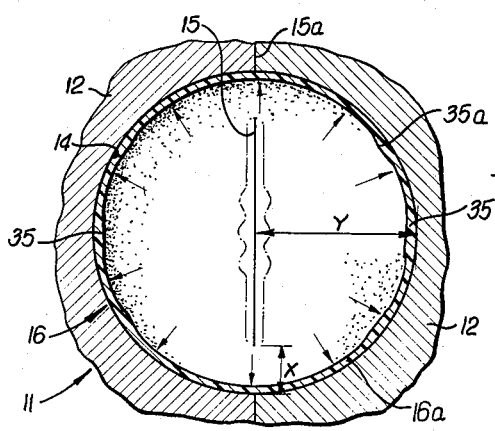
INVENTOR.
WILLIAM T. DONNELLY
BY
ATTORNEY.

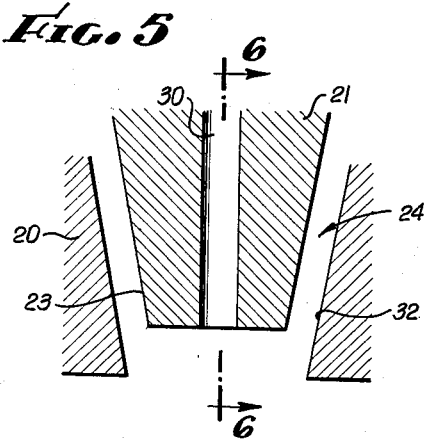
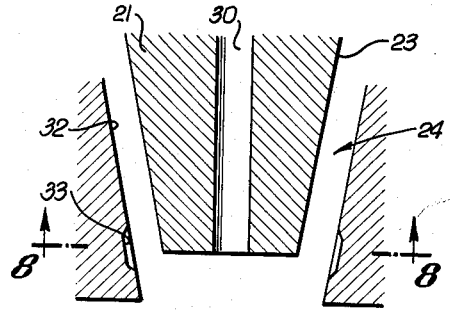
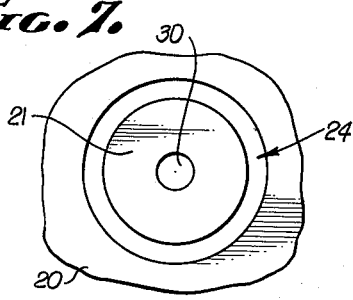
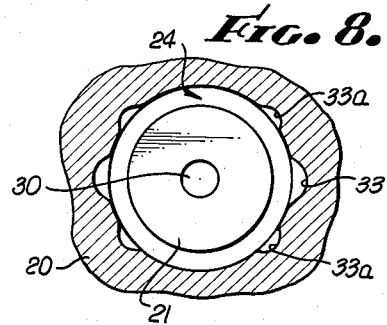
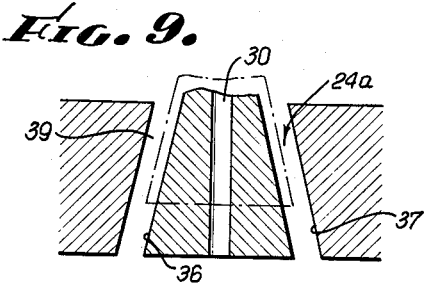
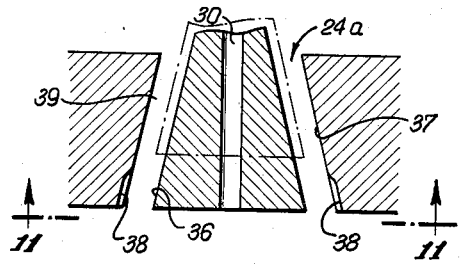
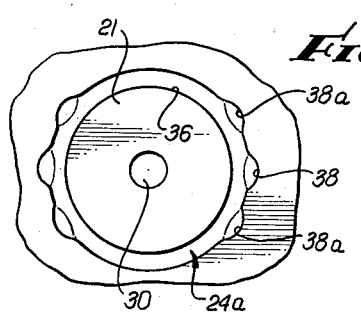
INVENTOR.
WILLIAM T. DONNELLY
ATTORNEY.

Dec. 24, 1963  W. T. DONNELLY  3,114,932
PLASTIC OBJECT BLOW MOLDING METHOD AND APPARATUS
Filed Feb. 20, 1962  3 Sheets-Sheet 3

INVENTOR.
WILLIAM T. DONNELLY
BY
ATTORNEY.

United States Patent Office 3,114,932
Patented Dec. 24, 1963

3,114,932
PLASTIC OBJECT BLOW MOLDING METHOD AND APPARATUS
William T. Donnelly, Brentwood, Mo., assignor to Purex Corporation, Ltd., Lakewood, Calif., a corporation of California
Filed Feb. 20, 1962, Ser. No. 174,591
12 Claims. (Cl. 18—5)

This invention has to do generally with the blow molding of plastic containers by initial formation of a tubular expansible parison which is received within a multi-section mold and expanded by internal air pressure to the mold configuration. The invention is particularly concerned with such blow molding of containers having relatively wide variances between neck and bottom diameters, such for example as jugs or bottles in the half-gallon to full gallon size range.

It has been recognized that to blow mold a tubular parison having uniform wall thickness for the formation of such containers, would result in such variances in wall thicknesses as to unacceptably weaken (because of thinness due to large diameter expansion) the enlarged lower or bottom extent of the container, assuming the parison wall thickness to be reasonably economical for the formation of the smaller diameter or neck portion of the container. If the parison wall thickness is increased to allow for adequate wall thickness and strength of the large diameter portion of the container, then the container becomes uneconomical because of excessive plastic consumption in forming the neck portion with wall thickness greater than is necessary.

In recognition of this problem, it has been proposed in the past to extrude successive lengths of the parison with different wall thicknesses, the greater thickness extent being expanded to form the large diameter portion of the container, with the lesser wall thickness of the parison expanded to form the lesser diameter or neck extent of the container. This expedient accomplishes to a degree, plastic distribution in the blown container in keeping with the practical requirements of different diameter wall thicknesses, but it does not afford desirable uniformity, or strength, in certain areas in the large diameter bottom extent of the container wall, because of the parison expansion in relation to the manner in which the parison is confined by the mold. This condition arises because the container bottom-forming end of the parison is pinched together between and along the parting line of the mold sections, so that blowing conformance of the parison to the mold involves relatively great displacement and stretching normal to the parting line, but much lesser displacement and stretching in the direction of the parting line. As a consequence, the parison wall thickness is reduced much more greatly in blowing to a diameter normal to the parting line, and in order to afford adequate wall thickness at that diameter, unnecessary wall thickness would exist at the parting line diameter.

The present invention has for its primary object to effect distribution of the parison plastic in a manner that will overcome the last discussed difficulty by providing adequate material for container strength at the blown diameter normal to the parting line, while limiting plastic usage to only that required for the wall thickness in the axial plane of the parting line, all to the end of meeting the strengths requirements of the enlarged portion of the container while avoiding excessive plastic consumption. The invention employs the prior proposal of extruding successive lengths of the parison at different wall thicknesses, but contemplates certain new concepts with respect to circular distribution of the plastic material in that portion of the parison that forms the bottom or enlarged diameter extent of the container.

The invention contemplates localized distribution of the plastic material at one or more places in the thicker bottom-forming section of the parison at opposite sides of the parting line plane, the essential concept here being to employ such localized plastic excesses as will adequately reinforce the container wall having its maximum expansion normal to the plane of the parting line, while otherwise retaining essentially the parison thickness within the parting line plane in the interests of economizing in the consumption of the plastic material. For this purpose, provision is made for extruding the parison with one or more circularly spaced, localized wall thicknesses at or along the places of maximum parison expansion, thus to afford in the blown container, internal rib-like reinforcements which locally stiffen and reinforce the container wall against deformation or collapse.

As will appear, the invention contemplates extruding the parison through an annular passage formed between an outer wall structure which may include a die section, and an internal annularly spaced mandrel which is shiftable axially to control the parison wall thickness. Blowing of the parison preferably is accomplished through an axial passage in the mandrel. The localized increases in the parison wall thickness, preferably are formed by providing the die and mandrel with generally parallel frustoconical surfaces, and locally recessing one or the other of the die and mandrel to accommodate the plastic for the localized thickness increases.

The invention will be further understood from the following detailed description of certain illustrative embodiments shown by the accompanying drawings, in which:

FIG. 1 is a sectional showing, diagrammatic in respects, of an illustrative parison extruding mechanism constructed and operated in accordance with the invention, together with an illustrative mold assembly for reception and blowing of the parison;

FIG. 2 is an enlarged cross section on line 2—2 of FIG. 1;

FIG. 3 is a fragmentary enlargement of the lower end of the mandrel and surrounding die, taken in the plane of FIG. 1;

FIG. 4 is a cross section on line 4—4 of FIG. 3;

FIG. 5 is a view similar to FIG. 3 showing the mandrel in raised position;

FIG. 6 is a section on line 6—6 of FIG. 5;

FIG. 7 is a bottom view taken on line 7—7 of FIG. 4;

FIG. 8 is a section taken on line 8—8 of FIG. 6;

FIGS. 9 and 10 are views similar respectively to FIGS. 4 and 3, showing a variational embodiment of the invention;

FIG. 11 is a bottom view taken on line 11—11 of FIG. 10;

Figure 12:
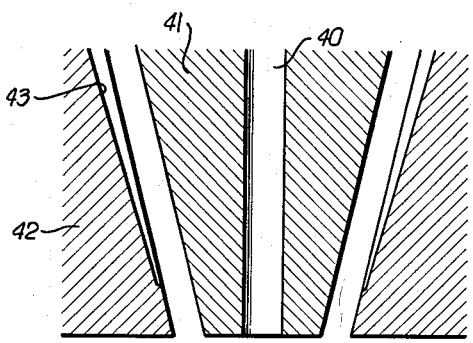
Figure 13:
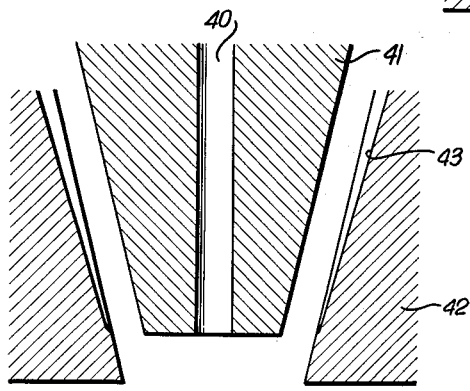
Figure 14:
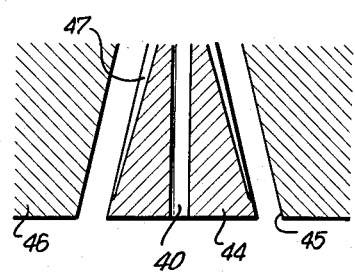
Figure 15:
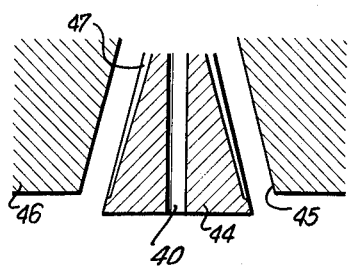

FIGS. 12 and 13 are views similar to FIGS. 3 and 6, showing a variational form of recess in the die, with the mandrel respectively in its down and up positions; and FIGS. 14 and 15 are views similar to FIGS. 12 and 13 illustrating the variational feature of providing the rib-forming recesses in the mandrel.

The assembly appearing in FIG. 1 comprises a parison extruding means generally indicated at 10, and typically a two section mold, generally indicated at 11, into which the parison is extruded for blowing, as will later appear. In further reference to the mold 11, the latter is shown to comprise a pair of sections 12 movable laterally apart and together by suitable means, not shown, to receive a tubular heated and inflatable parison 13 in the open condition of the mold sections so that the parison extrudes down, centrally of the mold cavities 14, a distance such that when the mold sections come together, the lower end of the parison is pinched together at what is termed in the art the parting line or axial plane 15 of the mold. As will be understood, the mold sections come together and interengage in the axial plane of the bottom parting line 15 and the side parting lines 15a. The parison is shown to be blown typically to form a container 16 having a relatively large diameter bottom and body portion 16a, and a reduced neck portion 16b. At this point it may be mentioned that since the invention is concerned with variable thickness extrusion and blowing of the parison as in accordance with the FIG. 1 showing, and not with subsequent disposition of the blown container, the showing and description are not encumbered by such additional expedients as would be used in practice, such as employment of known means for severing the parison at the mold head, or for shifting the mold assembly to allow for continuous extrusion of the parison if desired.

The parison extrusion means 10 comprises a tubular body structure including a section 18 receiving at its upper end a bushing 19 and at its lower end a die portion 20. This body structure contains an axially reciprocable mandrel 21 annularly spaced at 22 from the surrounding body structure, the lower end of the mandrel being frustro-conically tapered at 23 and spaced from the surrounding surface of the die at 24, so that spaces 22 and 24 form a parison extrusion passage into which heated plastic is introduced under the required pressure through inlet 25.

Any suitable means may be employed for controllably shifting the mandrel 21 to vary the spacing at 24 in accordance with the thickness requirements of different length portions of the parison. Merely as illustrative, the mandrel head 26 is shown to be engaged by cam 27 which, together with the upward thrust of coil spring 28, axially reciprocates the mandrel as and for the purposes stated. Blowing of the parison occurs by introduction of air from line 29 through axial passage 30 in the mandrel.

The structure 10 described thus far is known in the art to be usable for parison extrusion at varying wall thicknesses in that elevation of the mandrel, corresponding say to the FIG. 5—FIG. 6 position, increases the cross sectional area of the space at 24, thus causing the parison to be extruded at greater wall thickness, whereas lowering of the mandrel to the FIG. 3—FIG. 4 position reduces the spacing at 24 and therefore the parison wall thickness. Thus it is known that the lower extent of the parison going into the mold may be extruded at greater thickness to compensate for greater blowing expansion to the large diameter of the mold cavity, and that the upper extent of the parison may be extruded at reduced wall thickness in keeping with the lesser expansion required to form the upper and neck extents of the container.

The problem, however, of achieving plastic distribution to form the large diameter portion of the container with necessary strength consistent with economy in plastic consumption, is not solved merely by extruding the lower extent of the parison at uniform, though increased, wall thickness. The reason will be understood from FIG. 2 wherein the lower end of the parison is shown to be pinched together along the mold parting line 15, from which the flattened parison is to be blown generally in the direction of the parting line a relatively short distance $x$ to the opposite mold surface, whereas on the radius $y$ normal to the parting line, the distance to the corresponding mold surface is far greater. The result is that the parison wall thickness is thinned variably and generally proportionately to the distance of expansion, so that while an expanded thickness in $x$ direction might be both adequate and economical, the reduced thickness in the $y$ direction would so weaken the corresponding wall area of the container as to render the latter unsafe, or require the use of additional plastic which would appear as excess in the $x$ direction.

This problem is met in accordance with the invention by extruding the parison not only at variable wall thickness longitudinally of the extrusion, but also circularly thereof, at least with respect to that portion of the parison which forms the enlarged diameter portion of the container.

Provision for locally reinforcing the container wall thickness is illustrated in FIGS. 3 to 8, wherein FIGS. 3 and 5 are in the parting line plane, and FIGS. 4 and 6 in an axial plane normal thereto. Parallelism of the mandrel and die surfaces 23 and 32 is interrupted by recesses 33 in the die surface. These recesses should be at or close to the plane of line $y$ in FIG. 2, and additional circularly spaced recesses 33a may be provided between recesses 33 and the parting line plane of FIGS. 3 and 5. These recess areas may be of any suitable shape and vertical extent, although preferably they are such as to impart to the extruded parison, exterior rib-like wall thickness enlargements.

In operation, the parison is extruded initially with the mandrel 21 in the up position of FIGS. 5 and 6, at which the width of the extrusion passage 24 is greater and the cross sectional configuration of the parison is determined by positioning of the lower end of the mandrel opposite the recesses 33 and 33a. As a result, the parison is extruded to the configuration of the spacing in FIG. 8, throughout that length required to form the enlarged diameter portion of the container. The continuing, neck forming parison length is extruded with the mandrel lowered to the FIG. 3—FIG. 4 positions, at which the parison wall thickness is defined by the circularly uniform clearance at 34 which, as will be observed, is less than the clearance above the recesses in the raised position of the mandrel.

When the full parison length is extruded, the mold is closed to the FIG. 1 condition and compressed air is discharged through the mandrel passage 30 to blow the container. Since the exterior of the parison conforms smoothly to the mold cavity configuration, the wall thicknesses corresponding to the recessing at 33 and 33a, are displaced inwardly, so that the plastic assumes internal rib-like increased thicknesses as indicated at 35 and 35a in FIGS. 1 and 2.

FIGS. 9 to 11 illustrate a variational embodiment of the invention similar in all respects to the previously described form, except that here the frustro-conical configurations of the mandrel and die surfaces 36 and 37 are reversed so that the extrusion passage 24a enlarges downwardly to the outlet end. The bottom extent of the die wall is recessed at 38 similarly to the recessing in FIG. 8, so that in the down position of the mandrel, the parison is extruded at increased average thickness, with localized rib-like external increases formed by extrusion of the plastic into and out of the recesses 38. Extrusion of the container large diameter forming portion of the parison is followed by elevation of the mandrel to the broken line position at which the parison is extruded at reduced average wall thickness corresponding to the narrower clearance at 39. Thus the lower extent of the parison is extruded, as before with longitudinal rib-like enlargements corresponding to the recessing at 38 and 38a in FIG. 11, and upon blowing of the container, the plastic assumes an internal configuration essentially as depicted by FIG. 2.

FIGS. 12 to 15 illustrate further variational forms of the invention applicable as in the case of the previously described embodiments to parison extrusion for blowing of the container either at the top or bottom of the extrusion. It is illustrative, as before the container is assumed to be blown by air delivery through passage 40 in the mandrel 41. Here the die member 42 is shown to contain at each side of the parting line plane, grooves 43 which are tapered toward the outlet of the extrusion passage 43, in the down mandrel position of FIG. 12 the parison is extruded for substantially uniform and smaller wall thickness. In the FIG. 13 raised position of the mandrel the plastic is gradually compressed in extruding out of the bottom of the grooves 43, and in this instance the radial width of the grooves may be increased or decreased depending upon the mandrel elevation in relation to the grooves and their tapers.

The embodiments shown in FIGS. 14 and 15 illustrate the contemplation that the rib-forming recesses may be formed in either the die or mandrel. Here the downwardly flared, frustro-conical mandrel 44 is shown to be vertically reciprocable within a larger diameter correspondingly angular wall 45 in the die 46. The parison is extruded at substantially uniform smaller thickness in the mandrel up position of FIG. 14. When the mandrel is lowered, the rib formation occurs by extrusion from passages 47 in the mandrel, the radial widths of the ribs again being variable in accordance with the axial position of the mandrel relative to the die.

I claim:

1. In the formation of reduced diameter upper portion and enlarged bottom diameter containers by extruding a tubular parison and expanding the parison by internal air pressure within a mold comprising a pair of cavitated sections adapted to pinch together the walls of the parison along a bottom diameter in an axial plane of the formed container, the method that includes:
    (1) extruding one extent of the parison having at opposite sides of said plane a relatively lesser wall thickness throughout a length of the parison which forms said reduced diameter portion of the container, and
    (2) extruding another container bottom-forming extent of the parison of localized rib-like increased wall thicknesses at opposite sides of said plane which are greater than the first mentioned wall thickness and greater than the wall thickness of the last mentioned extent in said plane,
    (3) internally blowing said parison extent to conformance with the inside walls of said mold so as to cause said localized rib-like increased wall thicknesses to form axial ribs in the thinner walls of the blown container at opposite sides of said plane.

2. The method of claim 1, in which a plurality of said localized increased wall thicknesses are formed in the parison wall at opposite sides of said plane and at opposite sides of a diametrical plane normal to the first mentioned plane.

3. The method of claim 1, in which said one extent of the parison is extruded at substantially uniform wall thickness.

4. The method of claim 1, in which said extents are extruded through an annular passage, and including the further step of blowing said extents by air flow through a passage surrounded by said annular passage.

5. The method of claim 1, in which said bottom-forming extent of the parison is extruded first, followed by extrusion of said one extent of the parison, and in which the total parison is blown to the mold configuration by air introduced axially into the end of said one extent of the parison.

6. Apparatus for forming hollow plastic containers by extruding and blow molding a tubular parison, comprising an outer tubular structure and a mandrel member movable axially within an annularly spaced from the wall of said structure to form an annular extrusion passage, means for forcing plastic material through said passage to form a tubular parison, said structure including a die member surrounding a portion of the mandrel member and having at one relative axial mandrel position lesser annular spacing about and at opposite sides of an axial plane of the mandrel member, and having in another relative axial mandrel position greater spacing about the mandrel member in the form of localized rib-like recesses in one of said members at opposite sides of said plane, means for shifting the mandrel member between said positions during extrusion of the parison to form the latter with different wall thicknesses corresponding to said spacings, and a pair of molding sections positioned to receive said parison upon extrusion, and means for blowing air to said parison for expanding same to conformance with the inside walls of said molding section.

7. Apparatus according to claim 6, in which there are a plurality of said recesses at each of the opposite sides of said plane.

8. Apparatus according to claim 6, in which opposed extrusion surfaces of the mandrel member and said die member are essentially frustro-conical.

9. Apparatus according to claim 6, in which said localized recesses are in said die member.

10. Apparatus according to claim 8, in which the frustro-conical surface of one of said members is recessed to form said localized recesses.

11. Apparatus according to claim 6, in which said means for blowing air comprises an axial through passage in said mandrel for the delivery of blowing air to the parison.

12. Apparatus according to claim 6, in which said recesses are of tapered downwardly reducing depth.

References Cited in the file of this patent
UNITED STATES PATENTS

| | | |
|---|---|---|
| 2,632,202 | Haines | Mar. 24, 1953 |
| 2,687,997 | Marchand | Aug. 31, 1954 |
| 2,750,625 | Colombo | June 19, 1956 |
| 2,780,835 | Sherman | Feb. 12, 1957 |
| 3,019,481 | Negoro | Feb. 6, 1962 |
| 3,045,281 | Skobel | July 24, 1962 |